United States Patent [19]

Sasaki et al.

[11] Patent Number: 4,810,387

[45] Date of Patent: Mar. 7, 1989

[54] METHOD FOR REMOVING WATER SOLUBLE SUBSTANCES IN NON-WATER-SOLUBLE FLUID

[75] Inventors: Akira Sasaki, Yokohama; Shinji Uchiyama, Matsudo; Yoshihisa Nagata, Yashio, all of Japan

[73] Assignee: Kleentek Industrial Co., Ltd., Japan

[21] Appl. No.: 912,424

[22] Filed: Sep. 26, 1986

[30] Foreign Application Priority Data

Sep. 28, 1985 [JP] Japan ................................. 60-213688
Dec. 12, 1985 [JP] Japan ................................. 60-277973

[51] Int. Cl.⁴ ....................... B01D 12/00; B01D 17/02
[52] U.S. Cl. ..................................... 210/634; 210/799
[58] Field of Search ......... 210/634, 708, 799, DIG. 5, 210/649

[56] References Cited

U.S. PATENT DOCUMENTS

| | | | |
|---|---|---|---|
| 2,522,378 | 9/1950 | Kirkbride | 210/DIG..5 |
| 4,479,875 | 10/1984 | Nelson | 210/DIG. 5 |
| 4,493,772 | 1/1985 | Tanaka | 210/DIG. 5 |

FOREIGN PATENT DOCUMENTS

| | | | |
|---|---|---|---|
| 11901 | 2/1974 | Japan . | |
| 53-149178 | 12/1978 | Japan | 210/689 |
| 106508 | 8/1979 | Japan . | |
| 25921 | 8/1985 | Japan . | |

*Primary Examiner*—Benoit Castel
*Attorney, Agent, or Firm*—Lowe, Price, LeBlanc, Becker & Shur

[57] ABSTRACT

A method for extracting and removing water-soluble substances from a non-water-soluble fluid containing water-soluble substances by using water or an aqueous solution as the extractant and bringing the non-water-soluble fluid and the water or aqueous solution into contact with each other by means of filters.

1 Claim, 2 Drawing Sheets

METHOD FOR REMOVING WATER SOLUBLE SUBSTANCES IN NON-WATER-SOLUBLE FLUID

BACKGROUND OF THE INVENTION

1. Field of the Invention

This invention concerns a method for removing water-soluble substances contained in non-water-soluble fluids and particularly a method of continuously removing such substances. More specifically, this invention concerns a method of purifying at high efficiency those oils contaminated by the incorporation of contaminating substances such as ammonia and chlorine gases.

2. Description of the Prior Art

Ammonia or chlorine gases in oil or water have hitherto been removed by the method of using vacuum degasification or adsorbents such as active filler earth. However, the former method requires a large-scaled apparatus and high cost, and the latter method contaminates the oil and requires troublesome procedures for the replacement of exhausted adsorbents while providing relatively low capacity for the saturation of adsorption. On top of these, loss of oil was excessive and the yield was low. Accordingly, there have been practical problems in these prior art methods.

SUMMARY OF THE INVENTION

An object of this invention is to overcome the technical problems in the prior art through a method quite different from the above-mentioned conventional methods.

A specific object of this invention is to provide a method for efficiently extracting and removing water-soluble substances contained in non-water-soluble fluids used, for example, as vacuum pump oils, lubricants, sealing materials and insulating mediums. This will be done by using water or an aqueous solution as the extractant and by bringing the non-water-soluble fluid and water or aqueous solution into contact by way of filters, therefore a continuously removing these substances.

DETAILED DESCRIPTION OF THE INVENTION (Example of Non-water-Soluble Fluids)

Non-water-soluble fluids can generally be classified into those fluids having specific gravity higher than that of water and lower than that of water.

(i) The non-water-soluble fluids having specific gravity higher than that of water include fluorinated fluids, for example, perfluoropolyethers, which have widely been employed as vacuum pump oils, lubricants and sealing materials for semiconductor processing devices such as ion implantation device or plasma dry etching device. Commercially available perfluoropolyethers, include Fomblin Y (registered trademark of Montefluos S.p.A in Italy) sold from Nippon Mont Edison Co., Ltd.

(ii) Non-aqueous fluids having a specific gravity lower than that of water can include mineral oils. (Example of water-soluble substances)

Water-soluble substances contained in non-water-soluble fluids include ammonia, ammonium hydroxide, chlorine, hydrogen chloride, hydrogen fluoride and other minute amount of impurities.

In the case of using such non-water-soluble fluids, for example, as vacuum pump oils or lubricants for semiconductor processing device, water-soluble substances such as gaseous ammonia, chlorine or minute amount of impurities contained in the working atmosphere may possibly be mixed into the fluids as impurities. These water-soluble substances, when mixed into the non-water-soluble fluids, will change the viscosity of the non-water-soluble fluids thereby lowering the pressure, reducing performance of the vacuum pumps, or causing corrosion in vacuum pumps or other like apparatus.

In view of the above, it is necessary to remove the incorporated water-soluble substances and purify the non-water-soluble fluids.

(Water or Aqueous Solution)

Purified water such as tap water or distillated water is used. The water-soluble substances can be extracted and removed more effectively by (a) using a weakly alkaline aqueous solution instead of water for extracting and removing water-soluble substances that show acidic nature when dissolved in water or (b) using a weakly acidic aqueous solution instead of water for extracting and removing water-soluble substances that show a basic nature when dissolved in water.

A weakly alkaline aqueous solution is prepared by using a basic compound such as sodium hydroxide, or a weakly acidic aqueous solution is prepared by using an acidic compound such as hydrogen chloride.

(Filter Device)

Any known filtering material such as paper, non-woven fabric, synthetic resin foam and the like can be used so long as they are acid- and alkaline-resistant and are not leached into the non-water-soluble fluids.

The pore size of the filters is desirably as small as possible in order to make greater the area of contact between the non-water-soluble fluid and water or aqueous solution. It is particularly preferred to use those filters having water absorbing and retaining properties and capable of forming a sort of water curtain when absorbing water. For example, DH-S2 element (trade name of filters manufactured by Kleentek Industrial Co., Ltd.) is recommended since the efficiency of contact between the non-water-soluble fluid and the water or aqueous solution can further be improved.

The filter is shaped into a cylindrical form having a hollow central portion.

A cartridge type filter is convenient for use and replacement. In view of the above, it is preferred to use such a filter device comprising a cylindrical vessel having inner and outer circumferential surfaces made of metal plates having liquid-permeating apertures such as punched plates and filter materials contained therebetween.

EMBODIMENT OF THE INVENTION (Apparatus for removing water-soluble substances and the operation thereof)

Figure 1:
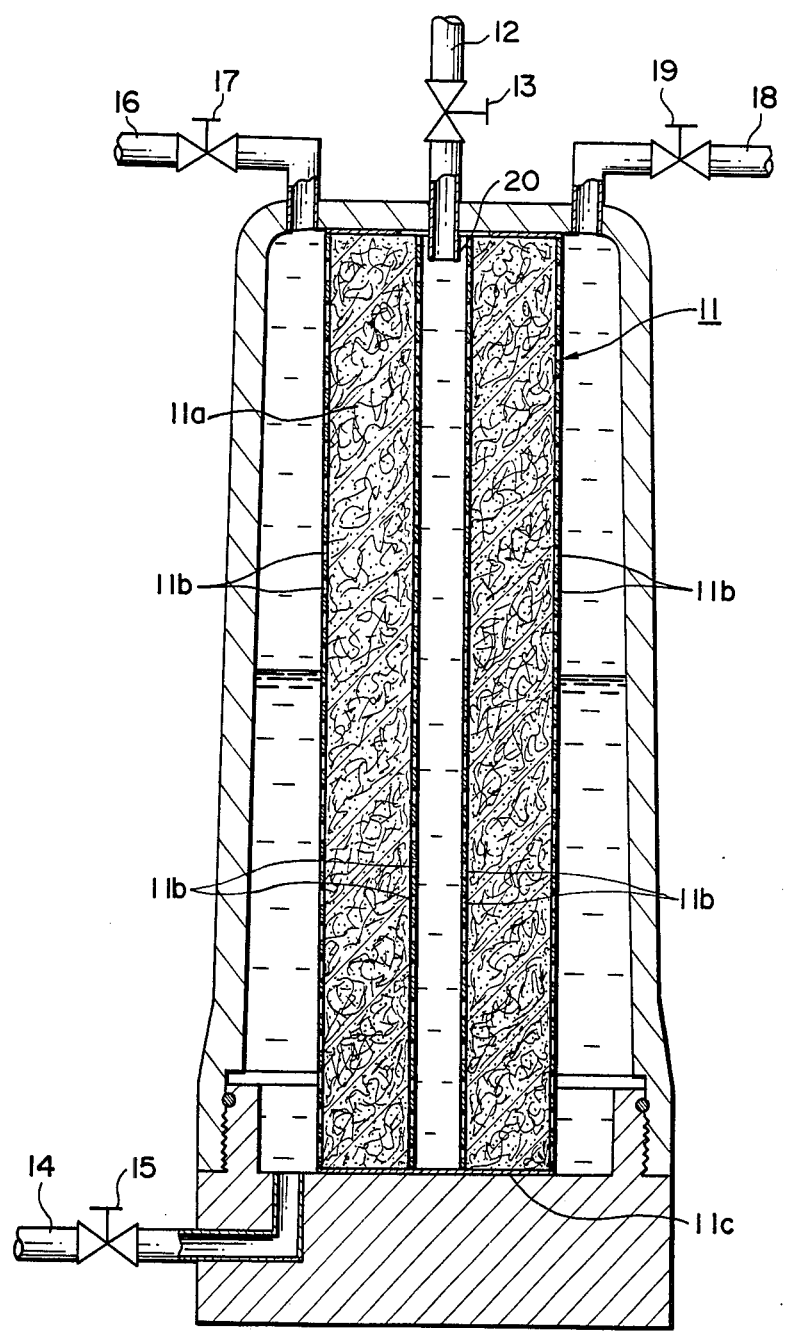
FIG. 1 is a schematic cross sectional view of a device for removing water-soluble substances according to this invention.

Description will be made referring to FIG. 1. FIG. 1 shows one embodiment of an apparatus for removing water-soluble substance according to this invention.

A filter device (11) is disposed to the inside of a vessel main body (10). The main body (10) is equipped with a pipe (12) for introducing the non-water-soluble fluid containing water soluble substances, a pipe (14) for discharging purified non-water-soluble fluid, a pipe (16) for introducing water or an aqueous solution and a pipe (18) for discharging water or an aqueous solution extracting the water-soluble substances therein. The filter device (11) comprises a cylindrical vessel having inner and outer circumferential surfaces made of punched metal plates (11b) and a metal disk (11c) that closes the bottom thereof, as well as filters made of non-woven fabrics (11a) contained in the vessel.

The hollow portion at the center of the filter device is opened at its upper end, and a pipe (12) for introducing the non-water-soluble fluid is inserted at the end (20) to the opening.

The main body of vessel is made of transparent synthetic resin so that the inside can be observed.

The operation of the apparatus will be explained while referring to the case of processing non-water-soluble fluids having a specific gravity higher than that of water.

After closing the ON-OFF valves (13), (15), water is introduced through the pipe (16) and fully charged in the vessel main body by opening the ON-OFF valve (19) and the ON-OFF valve (17) consecutively. Then, after closing the ON-OFF valve (17) and opening the ON-OFF valve (13), a non-water-soluble fluid containing water-soluble substances is introduced through the hollow central portion of the filter device to the inside of the vessel main body. Since the bottom of the filter device is closed with the metal plate, the non-water-soluble fluid is passed through the filter and then accumulated at the lower portion of the vessel main body. Since the filter is filled with water, the non-water-soluble fluid is brought into sufficient contact with the water upon passing through the filter and the water-soluble substances contained in the fluid are readily extracted into the water. On the other hand, since the water has a lower specific gravity, it is discharged externally through the discharging pipe (18) disposed at the upper portion of the vessel. When the non-water-soluble fluid is accumulated to about one-half volume of the vessel main body, the ON-OFF valves (13), (19) are closed, while the ON-OFF valve (17) is opened. Then, while introducing the water from the pipe (16), the ON-OFF valve (15) is opened to discharge the purified non-water-soluble fluid out of the vessel main body by way of the discharging pipe (14).

Then, when the vessel main body is filled again with water, the ON-OFF valves (15), (17) are closed, while the ON-OFF valves (13), (19) are opened. Then, the non-water-soluble fluid containing the water-soluble substances is introduced into the filter device by way of the pipe (12) and the above-mentioned procedures are repeated.

The experimental test was carried out by using Fomblin Y (perfluoropolyether) as the non-water-soluble fluid that had been used as the vacuum pump oils for semiconductor processing device. Fomblin Y was previously mixed with chlorine or hydrogen chloride and had a pH value of 1.2 before the processing.

Tap water was introduced into and filled in a removing device having 1.7 liter inner volume by way of the pipe (16). Then, after closing the ON-OFF valve (17) and opening the ON-OFF valves (13), (19), 0.7 liters of Fomblin Y were introduced to the hollow central portion of the filter device by way of the pipe (12) and the overflown water was discharged externally through the pipe (18).

When passing through the filter, Fomblin Y was brought into contact with the water previously filled therein and the chlorine or hydrogen chloride mixed in Fomblin Y was extracted into the water. The chlorine reacted with the water to form hydrogen chloride, which was extracted into the water. The purified Fomblin Y thus recovered had a substantially neutral pH of 6.5 showing that the chlorine or hydrogen chloride was removed effectively.

pH was measured according to the test method for the neutralization value of petroleum products (JIS K2501-1980). In this method, pH value is determined by a potential difference titration method using an 1/10N standard isopropyl alcohol solution of potassium hydroxide as a titrating solution. 25 ml of Fomblin Y were added to 100 ml of boiling water, shaken sufficiently and separated from the aqueous layer. The pH value of the aqueous layer was then measured.

In the case where the fluid to be processed is a non-water-soluble fluid having a specific gravity lower than that of water, the removing apparatus shown in FIG. 1 is used while being upturned so that the discharging pipe (14) for the purified non-water-soluble fluid is situated above.

The non-water-soluble fluid having a specific gravity lower than that of water as the fluid to be processed can include mineral oils incorporated with ammonia or ammonium hydroxide.

In the removing apparatus shown in FIG. 1, the pipe (16) for introducing the water or aqueous solution and the pipe (18) for discharging the water or aqueous solution extracting the water-soluble substances therein are disposed independently from each other. However, the pipe (18) may alternatively be branched from the pipe (16), in which a three-way valve may be provided to the junction point instead of disposing the ON-OFF valves (17), (19) separately.

The pipe (12) for introducing the non-water-soluble fluid may be connected to the upper end of the hollow central portion of the filter device by using another connection pipe.

(Continuous Removing Method for Water-Soluble Substance)

In the continuous removing method according to this invention, a non-water-soluble fluid containing water-soluble substances and the water or aqueous solution are brought into contact and mixed forcively by means of a pump, so that the water-soluble substances are extracted by the water or aqueous solution also during transportion of the fluids by the pump. Then, both of the fluids are caused to pass through acid- and alkaline-resistant filters disposed in the removing apparatus for water-soluble substances and having small filter pores causing a sufficient contact between both of the fluids. Through this contact, by which the water-soluble substances are dissolved efficiently in the water or aqueous solution in a shorter period of time and then continuously extracted and removed.

Figure 2:
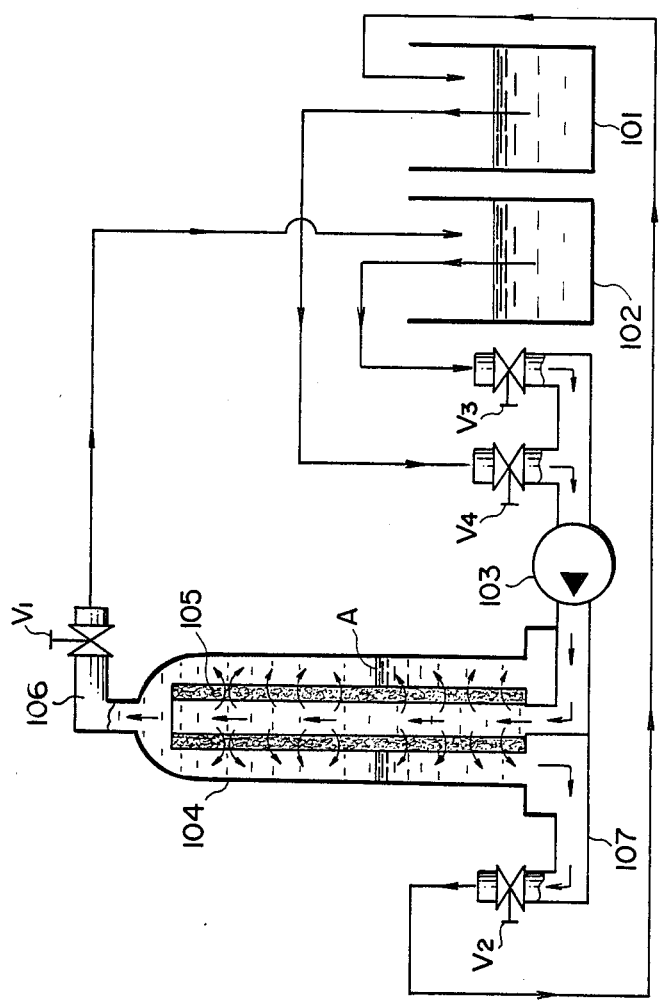
FIG. 2 is a somewhat diagrammatic schematic view illustrating the apparatus for carrying out the continuous removing method for water-soluble substances according to this invention.

A description will now be made referring to FIG. 2. FIG. 2 shows one embodiment for the method of continuously removing the water-soluble substances according to this invention.

From a storage vessel (101) for non-water-soluble fluids containing water-soluble substances and a water vessel (102), both of the fluids are supplied through respective supply pipes into a pump (103), where both of the fluids are mixed forcively. The fluids thus mixed are transported by the operation of the pump to a removing apparatus for water-soluble substances. In this condition, most of water-soluble substances may be extracted into water and separation of water from non-water-soluble fluid is required, in addition to extraction of the remaining water-soluble substances from the non-water-soluble fluid. In the removing apparatus, a cylindrical filter device (105) having a hollow central portion and opened at both ends is disposed and both of the fluids are supplied from the lower end of the hollow portion.

In the filter apparatus, DH-S2 element which form a sort of water curtain are incorporated into a cylindrical vessel formed with punched metal plates, in which the central portion is made hollow and both of the ends are opened.

The mixed fluids are brought into contact with the water curtain element. Upon passing therethrough, the water with the water-soluble substances mixed in the non-water-soluble fluid is assimilated to the water of the water-curtain and extracted from the non-water-soluble fluid and removed. After passing through the filter, both of the fluids are completely separated into two phases due to the difference in the specific gravity. The fluid of lower specific gravity is discharged from a discharging pipe (106), while the fluid of higher specific gravity is discharged from another discharging pipe (107). The discharged fluids may be returned to the respective vessels (101) and (102) so that they can be recycled. In this case, the boundary "A" between both of the fluids in the removing apparatus is kept at a substantially constant level by adjusting the amounts supplied and discharged of the fluids by the ON-OFF valves ($V_1$, $V_2$, $V_3$ and $V_4$) while recycling both of the fluids by means of the pump. FOMBLIN Y mixed with hydrogen chloride as the non-water-soluble fluid and an equivalent amount of water were recycled in the apparatus shown in FIG. 2. Table 1 shows the hydrogen chloride removing efficiency in relation to the processing time. The processing conditions are as described below:

Processing Conditions (i) Inner volume of the contaminating substance removing vessel ... 1.7 liter
(ii) Gear pump flow rate ... 0.66 liter/hr
(iii) Amount of FOMBLIN Y used ... 2 liter
(iv) Amount of water used ... 2 liter (v) Temperature of the processed fluid ... room temperature
(vi) Initial HCl concentration in FOMBLIN .. 140 mg/liter Method of measuring HCl concentration HCl concentration was measured according to the strong acid value method of JIS K2501-1980

TABLE 1

| Processing time (Hr) | 0 | 0.5 | 1 | 1.5 | 2 | 2.5 |
|---|---|---|---|---|---|---|
| HCl concentration (mg/l) | 140 | 66 | 44 | 18.4 | 7.4 | 0* |

*Measurement impossible

Although both of the fluids, i.e., the non-water-soluble fluid and the water are recycled in the processing method as described above, only the non-water-soluble fluid may be recycled in the case of using tap water as the extractant. Further, in the case where the amount of the non-water-soluble fluid or the amount of the water-soluble substances mixed therein is small, fluids may be introduced into and discharged from the processing system without recycling.

Furthermore, in the case of purifying a non-water-soluble fluid having a specific gravity smaller than that of water, the stage of the phase separation in the removing apparatus (104) is reversed. The non-water-soluble fluid is discharged from the discharging pipe (106) situated above. Accordingly, in this case the water is charged in vessel (101), while the non-water-soluble fluid is charged in vessel (102). In the case of using tap water without recycling, the water vessel may be saved.

Although both the upper end and the lower end of the central hollow portion are opened in the filter device shown in FIG. 2, the upper end may be closed. Further, in the case of fabricating the filter-containing cylindrical vessel with punched metal plates, the configuration of the punched apertures may be varied. For example, the size of the apertures may be made smaller in the lower portion and greater in the upper portion. In this way, the apertures can be distributed so that both of the fluids supplied from the lower end of the hollow central portion of the filter device can be passed throughout the entire region of the filter.

By changing the proportion of water/non-water-soluble fluid, the processing speed will be changed. When the proportion of water is increased, the processing time will be shortened.

ADVANTAGE OF THE INVENTION (1) Since the non-water-soluble fluid containing water-soluble substances and water or an aqueous solution are brought into contact with each other by way of filters, the water-soluble substances can be extracted and removed efficiently by the water or aqueous solution.

(2) Since the fluids are caused to pass through the filters, non-water-soluble minute dust particles such as fine pieces of metal caused by abrasion and mixed in the non-water-soluble fluid can simultaneously be eliminated.

(3) The operation is simple, economical, and requires no particular removing agents.

(4) Since the non-water-soluble fluid containing water-soluble substances and the water or an aqueous solution is forcively mixed by the pump, the water-soluble substances can be extracted and removed at high efficiency.

What is claimed is:

1. A method for continuously removing water soluble impurities from a non-water soluble fluid comprising the steps of:
providing a pump and a filter, said filter being composed of a material capable of absorbing and retaining water to form a water curtain;
continuously supplying said non-water soluble fluid containing water soluble impurities and water to said pump;
mixing said fluid and water by continuously passing a stream of said fluid and water through said pump;
forming a water curtain in said filter by supplying water thereto whereby said filter will absorb and retain water therein; subsequently passing said mixture through said filter whereby said impurities are dissolved in said water; and,
continuously recovering said purified non-water soluble fluid by separating said fluid from the water containing said dissolved impurities.

* * * * *